US012759358B1

(12) United States Patent
Hawthorne et al.

(10) Patent No.: US 12,759,358 B1
(45) Date of Patent: Oct. 13, 2026

(54) TORQUE ROD WITH IMPROVED BUSHING RETENTION

(71) Applicant: ZF FRIEDRICHSHAFEN AG, Friedrichshafen (DE)

(72) Inventors: William Hawthorne, Oakwood, GA (US); Stephanie Sutton, Gainesville, GA (US); Bradley Zimmerman, Gainesville, GA (US); Oscar Daniel Sanchez, Ixtlahuacan de los Membrillos (MX)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 19/262,351

(22) Filed: Jul. 8, 2025

(51) Int. Cl.
*B60G 7/00* (2006.01)

(52) U.S. Cl.
CPC .......... *B60G 7/001* (2013.01); *B60G 2206/11* (2013.01); *B60G 2206/80* (2013.01)

(58) Field of Classification Search
CPC . B60G 7/001; B60G 2206/11; B60G 2206/80
See application file for complete search history.

(56) References Cited

U.S. PATENT DOCUMENTS 3,408,124 A * 10/1968 Melton .................. B60G 7/005 403/288
4,840,395 A * 6/1989 Sturmon ................ B60G 7/001 280/86.75
5,564,521 A * 10/1996 McLaughlin ............ B60G 9/00 180/352
7,159,880 B2 * 1/2007 Budde ...................... F16C 7/026 280/124.128
7,201,530 B2 * 4/2007 Wappes, II ............ B60G 7/001 403/373
7,959,172 B2 * 6/2011 Nashawaty ............ B60G 7/008 280/124.1
8,091,763 B2 * 1/2012 Drabon .................. B23K 20/12 228/114.5
8,757,649 B2 * 6/2014 Erdogan ............... F16C 27/063 280/124.128
9,995,358 B2 * 6/2018 Powell .................. F16F 1/3835
10,208,658 B2 * 2/2019 Navarro ................ F02B 37/186
10,875,373 B2 * 12/2020 Reddehase ............. B60G 7/003
10,875,572 B2 * 12/2020 Reddehase ............. B21D 53/88
11,982,309 B2 * 5/2024 Kuroda ............... F16C 11/0642
12,257,874 B2 * 3/2025 Jeong ...................... B29C 45/14
2013/0199332 A1 * 8/2013 Powell .................... F16F 1/393 403/164
2021/0190167 A1 * 6/2021 Charmillot ............. B60G 7/001

FOREIGN PATENT DOCUMENTS

JP 09126220 A * 5/1997

* cited by examiner

*Primary Examiner* — Laura Freedman
(74) *Attorney, Agent, or Firm* — COZEN O'CONNOR

(57) ABSTRACT

A torque rod having a torque rod stem, a hub end arranged at an end of the torque rod stem having a bore partially therethrough, a bushing assembly arranged in the bore of hub end having: a pin; and a rubber sleeve surrounding at least a portion of the pin, a first end of the rubber sleeve is seated on a step of the bore, and a washer is arranged on an end of the rubber sleeve. A plurality of stakes are arranged at a first end of the hub end to mechanically retain the washer and the bushing assembly in the bore of the hub end.

10 Claims, 9 Drawing Sheets

TORQUE ROD WITH IMPROVED BUSHING RETENTION

BACKGROUND OF THE INVENTION

1. Field of the Invention

The disclosure relates to a torque rod with a fitted bushing, particularly for a chassis of a motor vehicle and to a method for fitting a bushing in a torque rod.

2. Description of Related Art

Torque rods are engineered to meet specific vehicle and performance requirements, with high-strength steel or, in some lightweight applications, aluminum selected for the rod body to ensure structural integrity. The manufacturing process begins with raw material preparation, where the metal is cut to size and either forged or cast into the desired rod shape. Forging involves heating the metal and shaping it under high pressure in dies, enhancing grain structure and strength. Casting, while less common for heavy-duty applications, allows for more complex geometries. After shaping, precision machining is applied to the rod ends and bushing bores to achieve tight tolerances. In fabricated designs, robotic MIG or TIG welding is employed to attach the forged or cast end hubs to the rod body, ensuring consistent weld quality, joint strength, and uniformity in high-volume production.

Surface treatment provides protection against corrosion and environmental wear. After initial cleaning via shot blasting or chemical baths, the rod is coated using methods such as powder coating, electrocoating (e-coating), or zinc plating. These coatings provide a durable barrier against moisture, road salt, and other corrosive agents. In some applications, a topcoat of paint is added for additional protection or color-coding.

Bushings, typically composed of natural or synthetic rubber, or polyurethane, are manufactured in parallel. For bonded bushings, the rubber compound is vulcanized directly onto metal inner and outer sleeves using heat, pressure, and adhesives to ensure strong chemical adhesion. This bonded structure increases durability and reduces the likelihood of separation under high loads.

During installation, bushings are pressed into the rod ends using hydraulic or pneumatic presses equipped with custom jigs to ensure precise alignment. A thin layer of lubricant or assembly compound is applied to ease the press-fit process and reduce the risk of rubber tearing or displacement.

Bushing retention can be enhanced through a combination of techniques: interference fit (press fitting), chemical bonding to sleeves, encapsulation within a machined or cast housing, and curled hub designs that mechanically lock the bushing in place. In heavy-duty or serviceable torque rods, external retaining rings or end caps may also be used.

U.S. Pat. No. 5,564,521 discloses a torque rod assembly where elastomer bushings are press-fitted into forged eyelets. The bushings are maintained in place by friction fit, and alternative bonding techniques, such as adhesives, to ensure secure retention.

U.S. Pat. No. 4,840,395, discloses a torque rod with bushings surrounded by a polyurethane interface bonded to the inner surface of the rod end.

SUMMARY OF THE INVENTION

In some aspects, the techniques described herein relate to a torque rod including: a torque rod stem; a hub end arranged at an end of the torque rod stem having a bore therethrough, wherein a first end of the bore has a first diameter and a second end of the bore has a second diameter smaller than the first diameter forming a step; a bushing assembly arranged in the hub end and including: a cylindrical or spherical pin; and a rubber sleeve surrounding at least a portion of the cylindrical pin, wherein a first end of the rubber sleeve is seated on the step of the bore; a washer arranged on a second end of the rubber sleeve; and a plurality of stakes arranged at the first end of the hub end to mechanically retain the washer and the bushing assembly.

In some aspects, the techniques described herein relate to a torque rod, wherein the torque rod stem is formed integrally with the hub end.

In some aspects, the techniques described herein relate to a torque rod, wherein the torque rod stem is attached to the hub end.

In some aspects, the techniques described herein relate to a torque rod, wherein the attaching is at least one welded, friction welded, glued, and threaded.

In some aspects, the techniques described herein relate to a torque rod, wherein the washer is formed integrally with the cylindrical pin.

In some aspects, the techniques described herein relate to a torque rod, wherein between 8 and 32 stakes inclusive, with 16 stakes being preferable, are arranged evenly spaced about a circumference of the first end of the hub end.

In some aspects, the techniques described herein relate to a torque rod, wherein the first end of the hub end has a lip at an outer circumferential edge and the plurality of stakes are arranged radially inside the lip.

In some aspects, the techniques described herein relate to a torque rod, wherein the washer is vulcanized to the rubber sleeve. For spherical pins, the washer, which is deformed into a soft right angle, is generally referred to as a ball cup and is vulcanized to the rubber sleeve.

In some aspects, the techniques described herein relate to a torque rod, wherein the torque rod stem is a composite material.

In some aspects, the techniques described herein relate to a torque rod, wherein the hub end is cast iron without a subsequent machining step.

In some aspects, the techniques described herein relate to a method for securing a bushing assembly within a hub end of a torque rod, including: aligning and positioning the hub end with the bushing assembly and washer in a fixture; selecting a staking tool having a plurality of teeth configured to plastically deform the hub end and form stakes, the plurality of teeth being equally spaced around a circumference of the tool to create the stakes and minimize stress on the hub end, the staking tool having an outer diameter less than an outer diameter of the hub end and including a through hole for attachment to a press; staking by applying a controlled force to material of the hub end using the staking tool causing plastic deformation of the material to form the stakes; allowing the material to flow creating an interference fit where deformed material of the hub end mechanically retains the washer and the bushing assembly; and forming a step on an upper surface of the hub end leaving an unstressed lip during the staking.

In some aspects, the techniques described herein relate to a method, further including inspecting the staking for any visible defects, such as cracks or incomplete deformation.

In some aspects, the techniques described herein relate to a method, wherein: the plurality of teeth of the staking tool are configured to produce a plurality of stakes in the hub end, each stake being formed by the plastic deformation of the material; and a cutting edge of each tooth forms the unstressed lip on the hub end, while a staking profile deforms the material to create the stakes.

In some aspects, the techniques described herein relate to a method, further including applying surface treatments for protection from corrosion and wear.

In some aspects, the techniques described herein relate to a method, wherein: each tooth of the staking tool includes a cutting edge that forms the unstressed lip and a staking profile that deforms the material of the hub end to form the stakes.

In some aspects, the techniques described herein relate to a method, further including using a single tool to press the bushing assembly and washer into the hub end and subsequently perform the staking once the bushing assembly and washer are seated.

Preferred further developments of the invention are obtained from the subclaims and the following description.

BRIEF DESCRIPTION OF THE DRAWINGS

Exemplary embodiments aspects of the invention are explained in more detail by way of the drawing without being restricted to this. There it shows.

DETAILED DESCRIPTION OF THE PRESENTLY PREFERRED EMBODIMENTS

Figure 1:
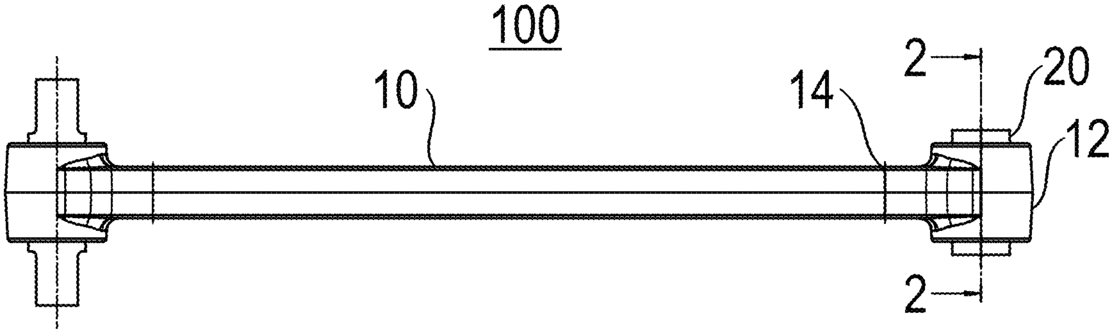
FIG. 1: is a torque rod.

FIG. 1 is an assembled torque rod 100. The torque rod comprises a rod stem 10 having hub ends 12. The hub ends 12 can be integral with the rod stem 10, threadingly attached to the rod stem 10, or welded to the rod stem 10. For a multipiece construction, the hub ends 12 are joined with the rod stem 10 at a seam 14. The rod stem 10 can be a composite material. A bushing assembly 20 is installed in a hub end 12. A multipiece assembly provides for a common rod stem 10 to be joined with different hub ends 12 for differing applications.

Figure 2:
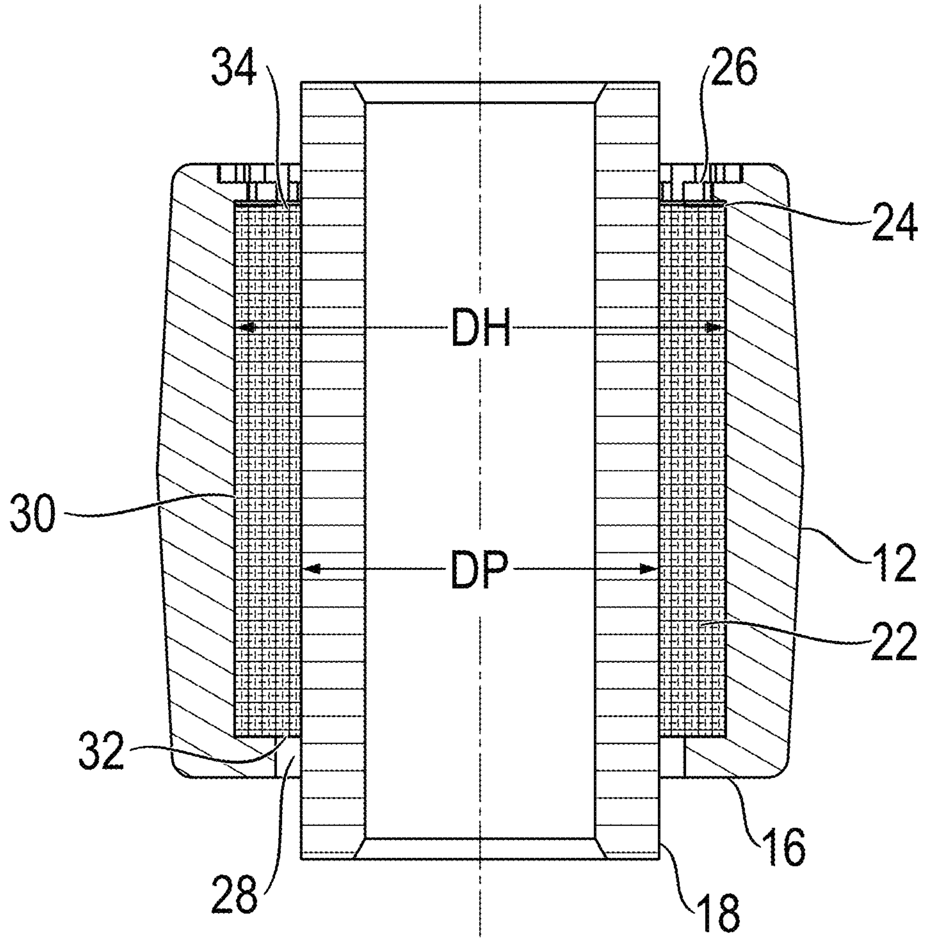
FIG. 2: is a cross section of an end of the tie rod and bushing assembly of FIG. 1.

FIG. 2: is cross section of the hub end 12 and bushing assembly 20 of FIG. 1. The hub ends 12 are preferably cast iron, although other materials can be used. The hub ends 12 can be cast, forged, or machined. A bore 30 is formed in the hub end 12 during formation, a retaining lip 16 is arranged at an end of the hub end 12. According to one aspect of the invention, no secondary machining is necessary for the bore 30.

The bushing assembly 20 comprises a cylindrical pin 18 that is vulcanized to rubber 22. When the bushing assembly is pressed into the hub end 12, the rubber may bulge in space 28. The bulge is typically between 0.1 mm and 1 mm. When installed, the rubber 22 is in compression in the hub end 12. The bushing assembly 20, particularly the cylindrical pin 18, is configured to articulate approximately 13 degrees. The articulation is based on the ratio of DH, the diameter of the housing, to $D_P$, the diameter of the pin. The ability of the cylindrical pin 18 to articulate allows the bushing to absorb stress instead of transmitting stress to the torque rod.

During assembly, the bushing assembly 20 is pressed into the hub end 12 until a first longitudinal end 32 of the rubber is seated on the retaining lip 16. A washer 24 is arranged at a second longitudinal end 34 of the rubber. The washer 24 can be vulcanized to the rubber 22. According to one aspect of the invention, the washer 24 is formed integrally with the cylindrical pin 18. After the bushing assembly 20 is pressed into the hub end 12 and the washer 24 is in place, the hub end 12 is deformed in a staking step. The staking operation is a precise and controlled process that secures the components by deforming the material of the hub end 12 to create a mechanical bond to retain the washer 24 and bushing assembly 20. The stakes 26 retain the bushing assembly 20 in the bore 30 because an inner diameter of the stake ends is smaller than an outer diameter of the washer 24. The washer 24 distributes the load to reduce stress to prevent the rubber from being damaged.

The washer 24 is corrosion resistant and of sufficient thickness and diameter to spread the load over a large area. According to one aspect of the invention, the inner diameter of the washer is 50 mm and the outer diameter of the washer is 60 mm. The washer 24 protects the rubber 22 from the staking edges to prevent ripping.

Figure 3:
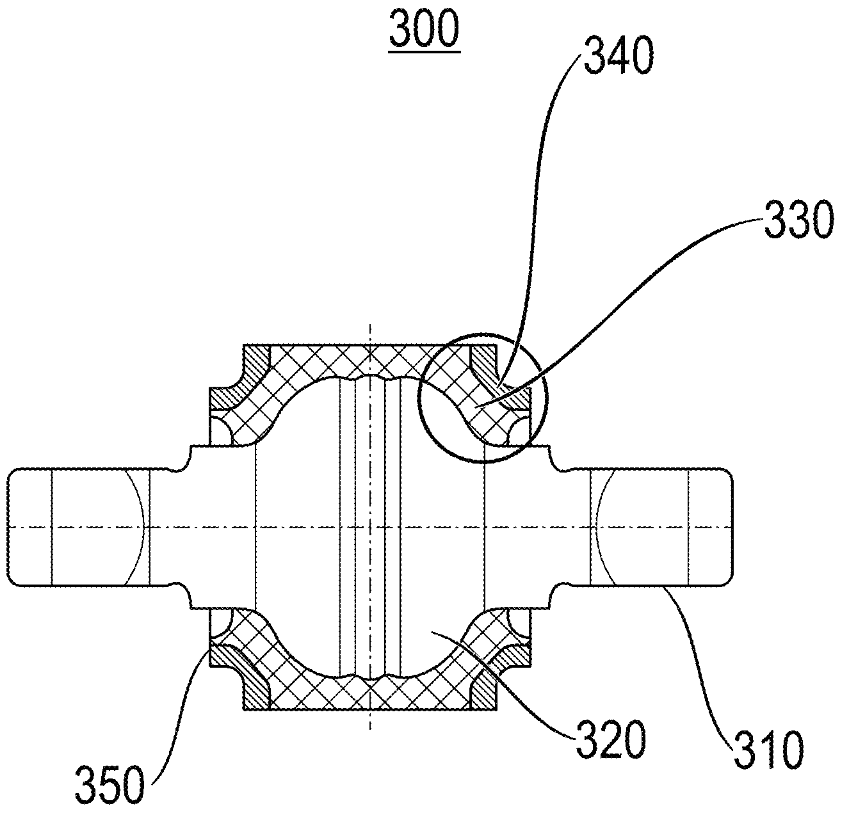
FIG. 3: is a cross section of bushing assembly.

FIG. 3 is cross section of a bushing assembly 300 with a spherical pin. The bushing assembly has a pin portion 310 and a spherical portion 320. The spherical portion 320 is surrounded by a rubber sleeve 330. The rubber portion is retained by ball cups 340. The bushing assembly is pressed into the hub end 12 until a first longitudinal end 350 is seated on the retaining lip 16.

Figure 4:
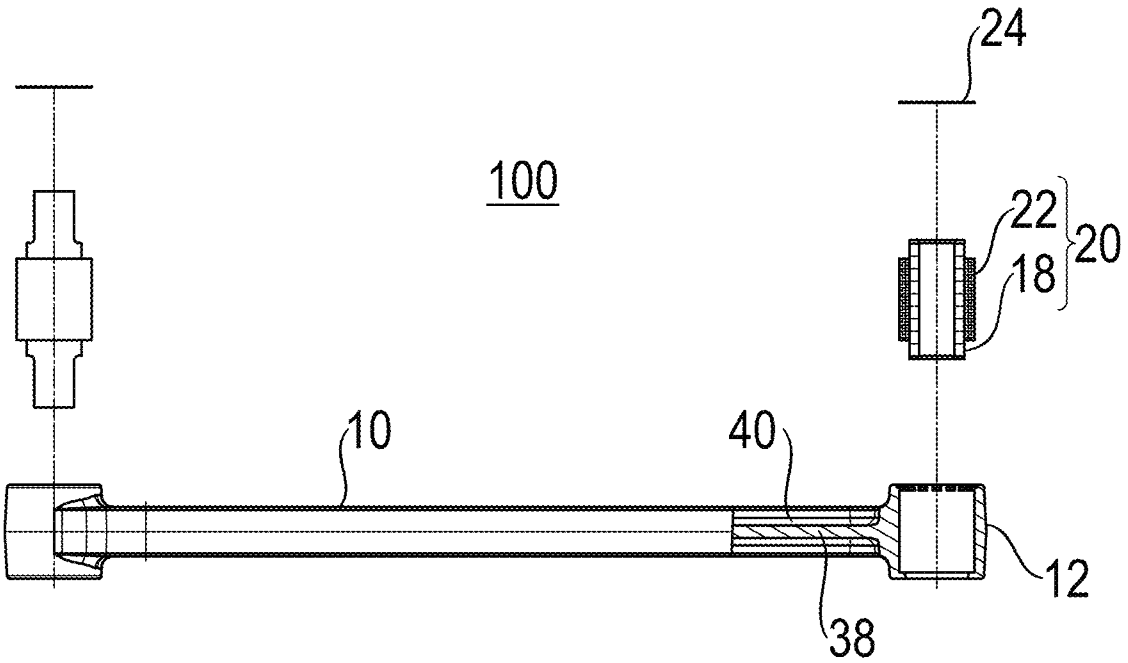
FIG. 4: is an exploded view of a torque rod.

FIG. 4: is an exploded view of a torque rod 100. As shown, the bushing assembly 20 comprising the rubber 22 and cylindrical pin 18 press into the hub end 12 followed by the washer 24. In FIG. 4, the staking is already present in the hub end 12. However, the staking would not be present until the washer 24 and bushing assembly 20 are inserted in the hub end 12. While shown with the bushing assembly 20, the bushing assembly 300 can also be used.

FIG. 4 shows one construction of the torque rod 100. According to one aspect of the invention, the hub end 12 has a bar portion 38 that is inserted into a sleeve portion 40 of the rod stem 10. A bonding step permanently connects the bar portion 38 to the sleeve portion 40 of the rod stem 10. Connection methods include welding, friction welding, screwing, adhesives, and the like.

Figure 5:
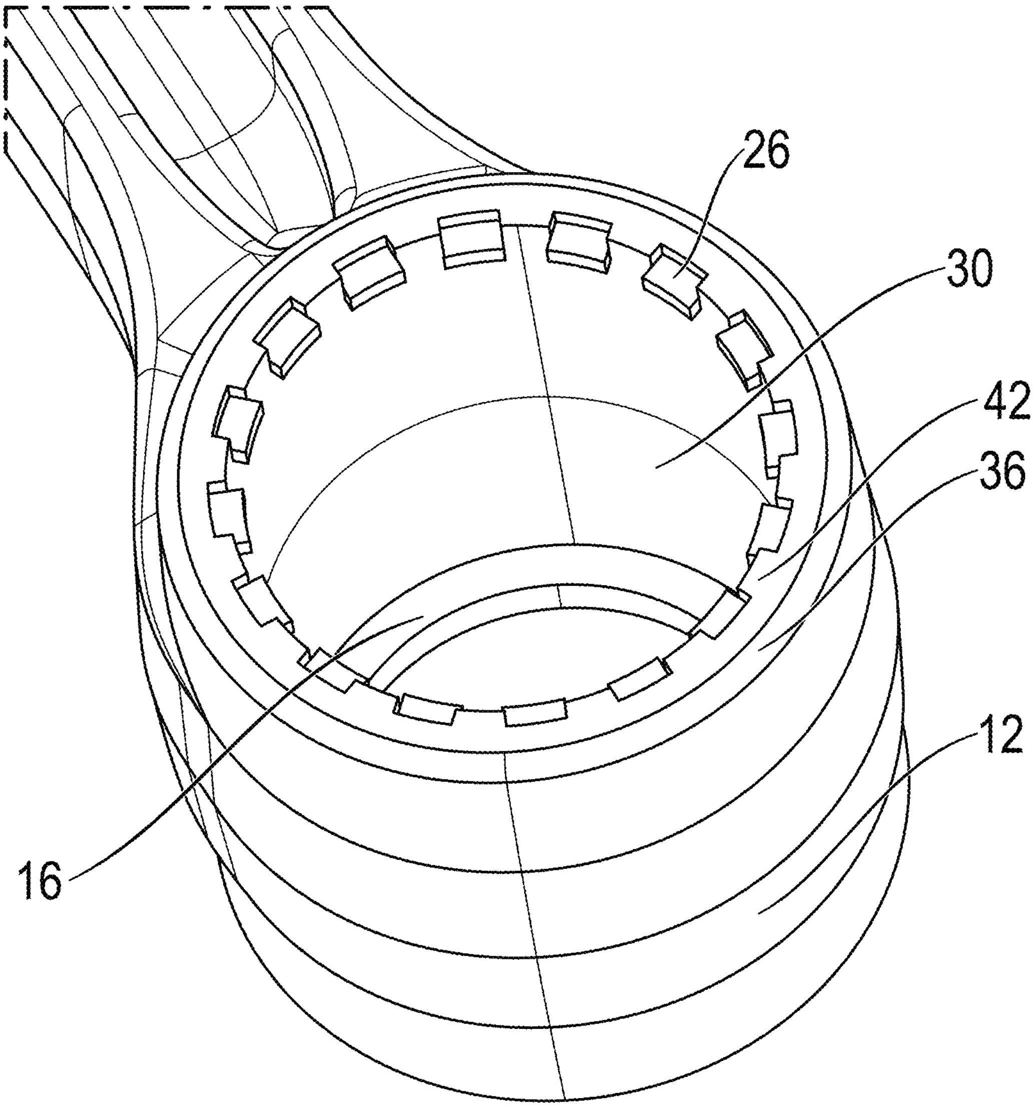
FIG. 5: is a perspective view of an end of the torque rod.
Figure 6:
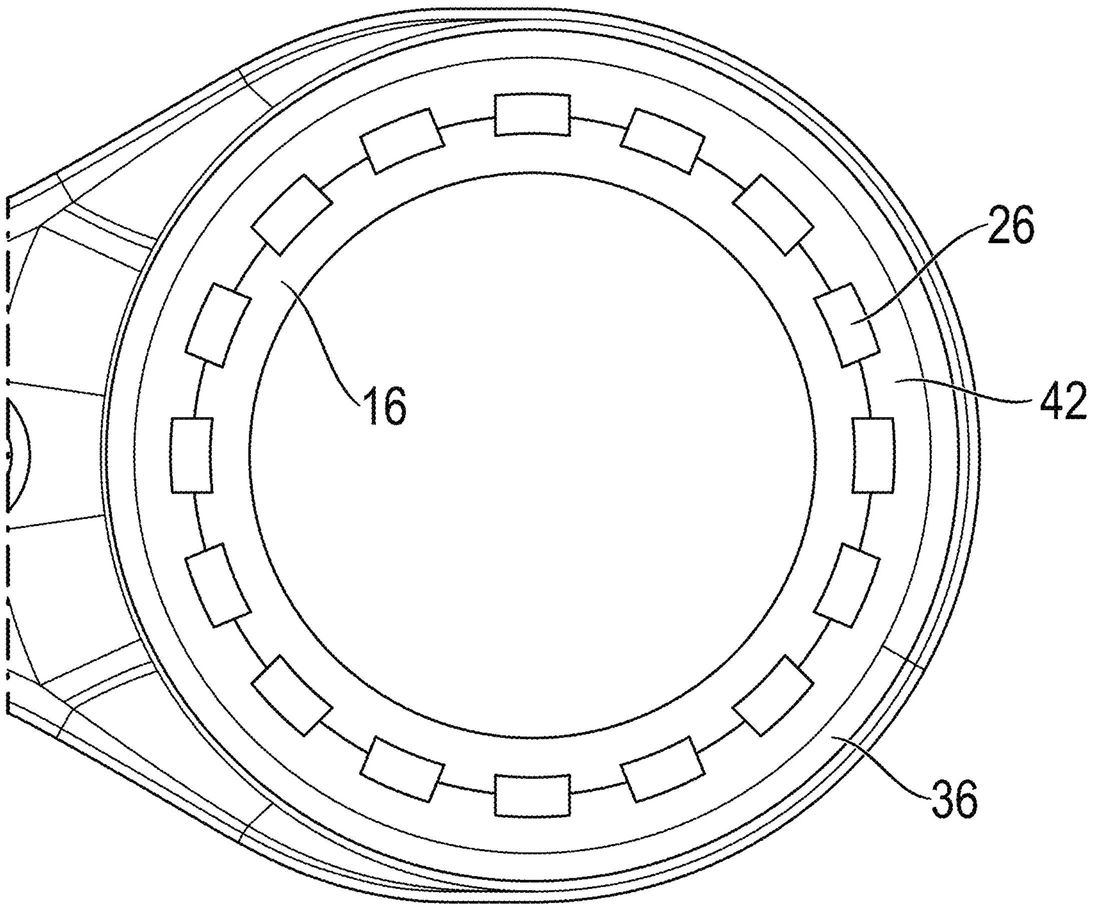
FIG. 6: is a top view of an end of the torque rod.
Figure 7:
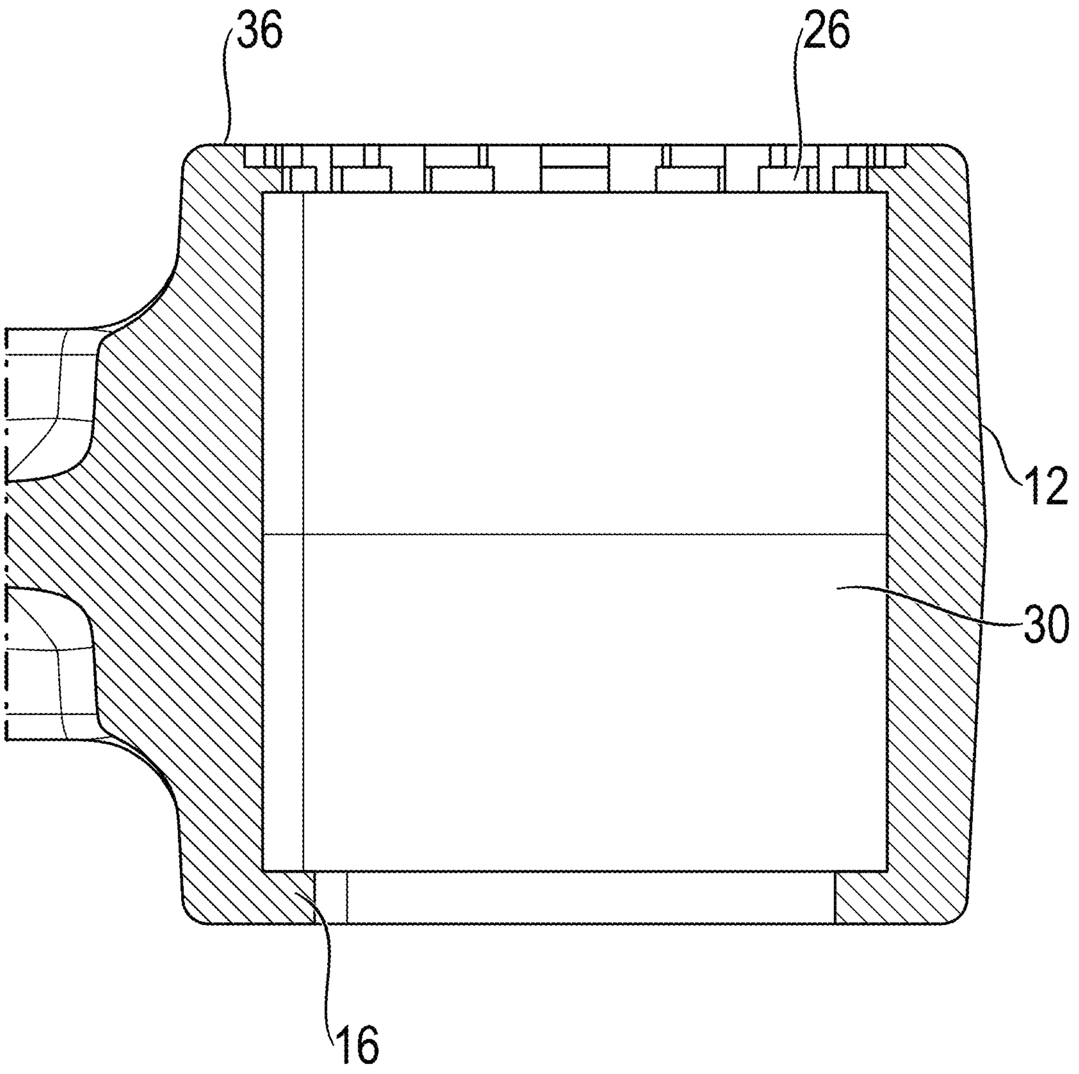
FIG. 7: is a cross section of an end of the torque rod.

FIG. 5: is a perspective view of the hub end 12 of the torque rod. FIG. 6 is a top view of the hub end 12 of the torque rod, and FIG. 7 is a cross section of the hub end 12 of the torque rod. The hub end 12 is shown in its final form, without a bushing assembly 20 installed. The hub end 12 is shown with 16 stakes 26. There are typically between 8 and 16 stakes. The stakes 26 are evenly spaced around the circumference of bore 30. The number of stakes 26 depends at least in part on a diameter of the housing. The stakes 26 spread the load on the housing when it is deformed and the washer 24 distributes the load between the bushing and the stakes. A step 42 on an upper surface of the hub end 12 and an unstressed lip 36 are formed during the staking process. The hub end 12 is typically iron or steel that is ductile enough to absorb the staking process. Plastic or composite can be used for the hub end 12 if the material has sufficient strength and resiliency to be staked and absorb torque rod stress during use.

Figure 8A:
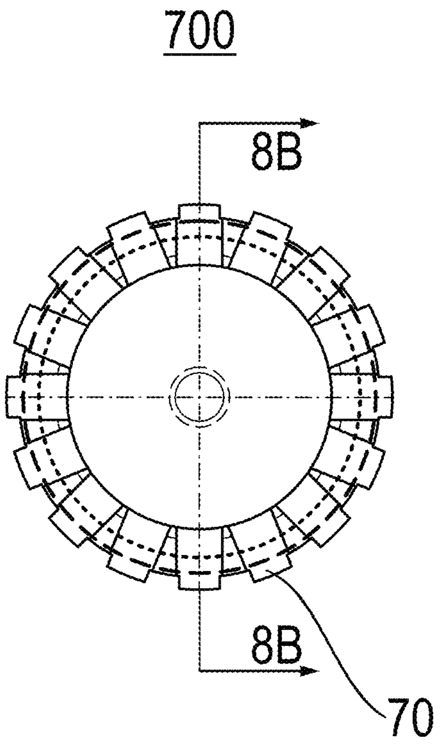
FIG. 8A-8D: are a bottom, cross section, top, and tooth detail of a staking tool for an end of the torque rod.
Figure 8B:
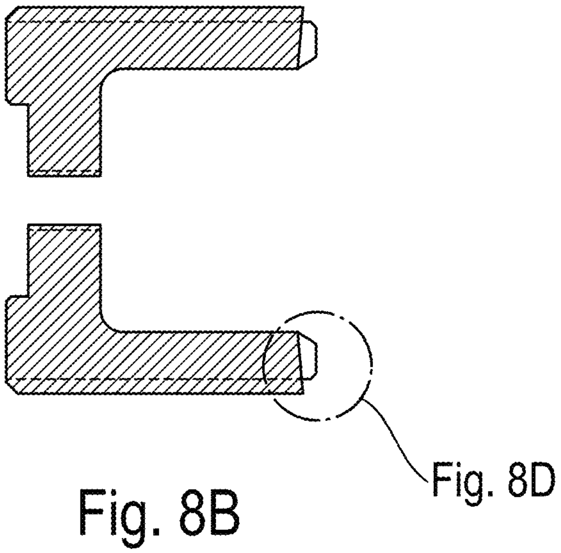
Figure 8C:
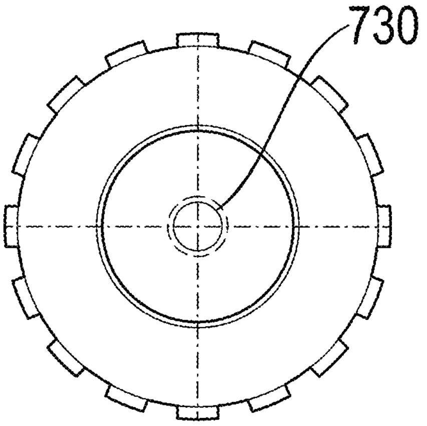
Figure 8D:
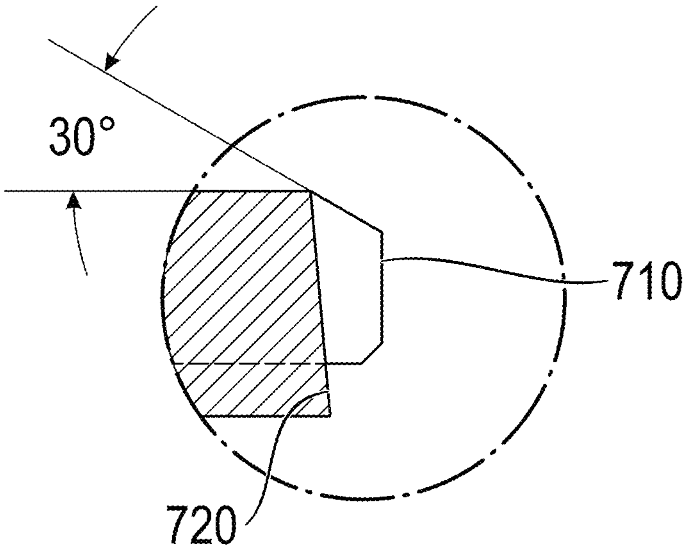

FIGS. 8A-8D show a staking tool 700 used to stake the hub end 12 of the torque rod. FIG. 8A is a bottom view of the staking tool. The depicted tool is configured for a 32 mm torque rod.

The staking tool 700 has a plurality of teeth 70 configured to plasticly deform the hub end 12 and form the stakes 26. The teeth 70 are equally spaced around a circumference of the tool to create the stakes, which also minimizes stress on the hub end 12. An outer diameter of the staking tool is less than an outer diameter of the hub end 12. Thus, during the staking operation, the staking tool forms the step 42 on the upper surface of the hub end 12 leaving the unstressed lip 36. The staking tool 700 includes a through hole 730 that is used to attach the tool to a press.

Each tooth 70 comprises a cutting edge 720 that forms the lip 36 and a staking profile 710 that deforms the material of the hub end 12 forming the stake 26. The lip 36 is not deformed, which minimizes mechanical stress of the material of the hub end 12 in the area of the stakes 26. The cutting edge 720 is sharp so that it cuts the material of the hub end 12.

The staking operation deforms the hub end 12. During staking, the hub end 12 with the bushing assembly and washer installed is aligned and positioned in a fixture or jig to ensure it remain stationary and correctly oriented. The staking tool 700, whether mechanical, hydraulic, or pneumatic, is selected based on the material properties and dimensions of the components. The tool is then adjusted to the correct settings, including pressure, depth, and speed, to achieve the desired deformation without damaging the components.

During the staking operation, the staking tool 700 applies a controlled force to the material of the hub end 12, typically through a punch or die equipped with the circumferentially arranged teeth 70. These teeth produce the plurality of stakes 26 in the hub end 12. The force, which can range from a few hundred to several thousand pounds per square inch (psi), causes plastic deformation of the material, meaning it is permanently deformed without breaking. The material flows into the desired shape creating an interference fit where the deformed material of the hub end 12 tightly grips the other component. The staking process does not create stress on the outer circumferential surface or lip 36 of the hub end 12 in the area of the stakes 26. The staking process is more efficient and cost effective than rolling closed the hub end 12. According to one aspect of the invention, a single tool is used to press the bushing assembly 20 and washer 24 into the hub end 12 and subsequently perform the staking operation once the bushing assembly and washer are seated.

Figure 9:
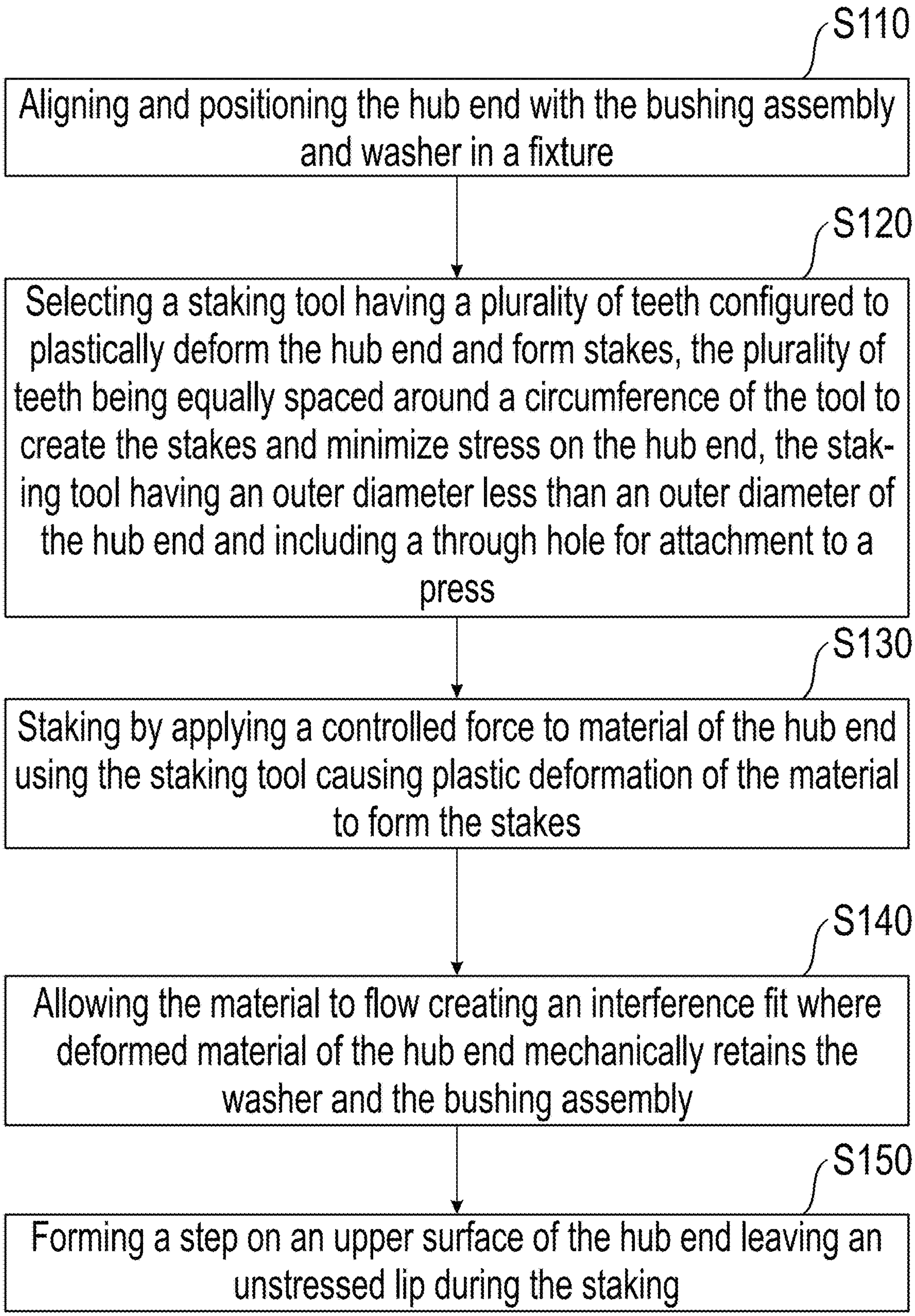
FIG. 9: is a flowchart for retaining a bushing in a torque rod end.

FIG. 9 is a flowchart for retaining a bushing assembly 20 in a torque rod end. In step S110, the hub end 12 with the bushing assembly 20 and washer 24 are aligned and positioned in a fixture. A staking tool 700 having a plurality of teeth configured to plastically deform the hub end and form stakes is selected in step S120. The plurality of teeth 70 are equally spaced around a circumference of the tool 700 to create the stakes 26 and minimize stress on the hub end. The staking tool is attached to a press. In step S130, a staking operation is performed by applying a controlled force to material of the hub end using the staking tool causing plastic deformation of the material of the hub end 12 to form the stakes 26. During staking in step S140, material flows creating an interference fit where deformed material of the hub end mechanically retains the washer and the bushing assembly. Additionally in step S150, a step on an upper surface of the hub end is formed during staking, leaving an unstressed lip.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torque rod comprising:
- a torque rod stem;
- a hub end arranged at an end of the torque rod stem having a bore therethrough, wherein a first end of the bore has a first diameter and a second end of the bore has a second diameter smaller than the first diameter forming a step;
- a bushing assembly arranged in the hub end and comprising:
  - a pin; and
  - a rubber sleeve surrounding at least a portion of the pin, wherein a first end of the rubber sleeve is seated on the step of the bore;
- a washer arranged on a second end of the rubber sleeve; and
- a plurality of stakes arranged opposite the step at a first end of the hub end to mechanically retain the washer and the bushing assembly.

2. The torque rod of claim 1, wherein the torque rod stem is formed integrally with the hub end.

3. The torque rod of claim 1, wherein the torque rod stem is attached to the hub end.

4. The torque rod of claim 3, wherein the attaching is at least one of welded, friction welded, glued, and threaded.

5. The torque rod of claim 1, wherein the washer is formed integrally with the pin.

6. The torque rod of claim 1, wherein between 8 and 32 stakes, inclusive, are arranged evenly spaced about a circumference of the first end of the hub end.

7. The torque rod of claim 1, wherein the first end of the hub end has a lip at an outer circumferential edge and the plurality of stakes are arranged radially inside the lip.

8. The torque rod of claim 1, wherein the washer is vulcanized to the rubber sleeve.

9. The torque rod of claim 1, wherein the torque rod stem is a composite material.

10. The torque rod of claim 1, wherein the hub end is cast iron without a subsequent machining step.

* * * * *